Figure 2:
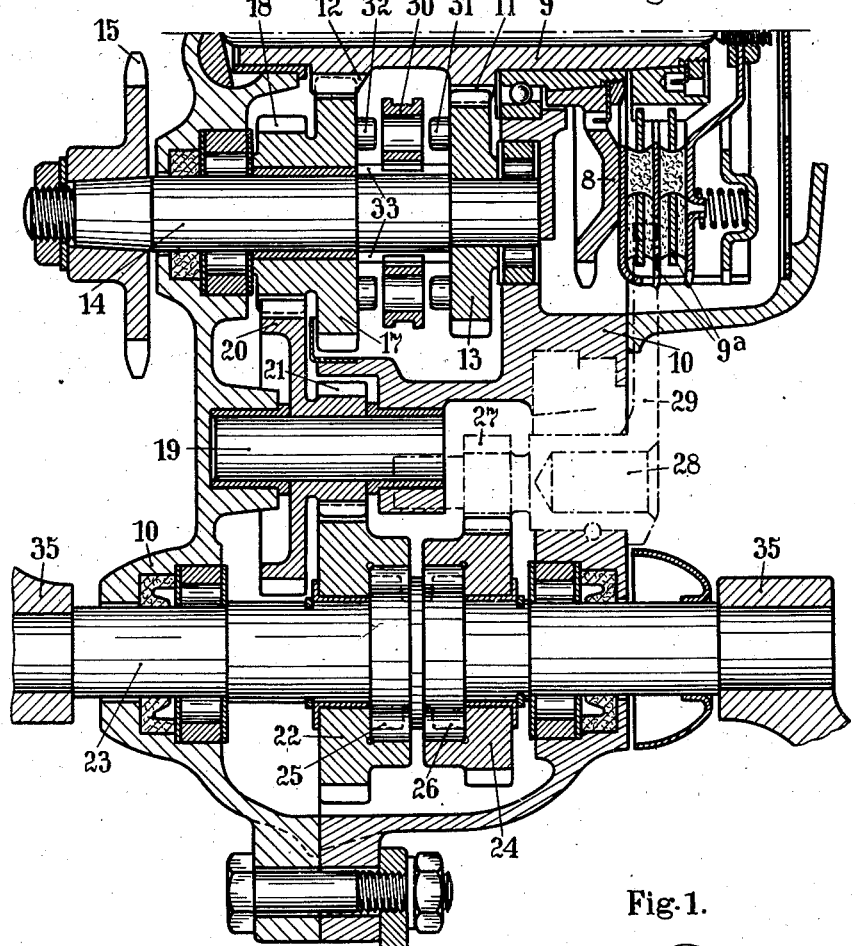

Aug. 20, 1940.　　G. STEINLEIN ET AL　　2,212,279

MOTOR DRIVEN BICYCLE

Filed Dec. 17, 1938

Inventors
Gustav Steinlein
Ludwig Bruckmoser
per Dean Fairbank & Hirsch

Patented Aug. 20, 1940

2,212,279

UNITED STATES PATENT OFFICE 2,212,279

MOTOR DRIVEN BICYCLE

Gustav Steinlein, Mainberg, near Schweinfurt, and Ludwig Bruckmoser, Schweinfurt, Germany Application December 17, 1938, Serial No. 246,298
In Germany December 29, 1937

1 Claim. (Cl. 180—33)

The invention relates to a motor driven bicycle having a pedal gear mounted in the free end of the gear casing facing the rear wheel of the bicycle the bearing of which pedal gear is arranged below the horizontal plane passing through the axis of the motor crank shaft. This pedal gear on being rotated forwardly may be connected to the motor by way of a roller locking device, a lay shaft and a disconnectable coupling, said motor being substantially characterised by the fact, that the driving sprocket wheel is mounted upon said shaft arranged between the motor shaft and the shaft of the pedal gear above the horizontal plane passing through the motor shaft.

Furthermore, according to the invention a shaft, which is driven on back pedalling of the pedal gear by means of a locking coupling mounted on the pedal crank shaft and by way of a pinion, and which is mounted in the gear casing at the side remote from the driving sprocket wheel above the pedal crank shaft, carries a lever connected to brake rods leading to the rear wheel of the bicycle.

In contradistinction to the subject matter of the invention, it has hitherto been usual in connection with motors for driving bicycles, having a pedal gear mounted in the free end of the gear casing facing the rear wheel of the bicycle the bearing of which pedal gear is arranged below the horizontal plane passing through the axis of the motor crank shaft, to connect the driving sprocket wheel to the pedal gear by a chain arranged outside the casing and to lead a chain in turn from the pedal gear to the rear wheel of the bicycle. According to another known construction two separate chains have been used leading to the rear wheel of the bicycle and serving for the motor drive and for the transmission of the power obtained by the pedal gear which in connection with bicycles sometimes is required besides the motor drive. In arranging the various parts in this manner care is also to be taken that on back pedalling of the pedal gear the brake is actuated as usual. Also, the bearing of the pedal gear is with regard to the saddle of the bicycle to be arranged in the manner usual with bicycles, so that the latter may be driven by pedalling alone without the bicyclist becoming fatigued.

The invention considers all these circumstances when using but one chain between the rear wheel and the motor, the motor output being transmitted first of all by way of a gear to a sprocket wheel shaft and from there by means of the chain to the rear wheel, while the pedal gear, mounted in the motor casing, also actuates, by way of gear wheels, the sprocket wheel shaft. When mounting the motor in the frame of the bicycle it is hereby necessary that the pedal gear bearing is arranged out of the way of the chain. This is obtained by the above mentioned special relative arrangement of the three shafts, i. e., the motor crank shaft, the pedal gear shaft and the sprocket wheel shaft. On the other hand the arrangement of the gear wheels for the transmission of power to the sprocket wheel shaft is such, that for the purpose of effectively assisting the motor, for instance when climbing, the maximum number of revolutions of the pedal gear over the various gears corresponds to the number of revolutions at which the motor still produces its most favorable torque. The lowest number of revolutions of the motor for a suitable torque is about $n=1500$; the most favorable number of revolutions of the pedal gear is about $n=60$ to 80. Consequently in accordance with certain aspects of the present invention, with the low speed transmission in gear, the speed ratio between the pedal crank and the motor is at least 1:20.

Besides obtaining the above mentioned advantages, the pedal gear of the present invention is so arranged, that by throwing the gear into idle running position, starting of the motor may be effected in a simple manner similar to that in connection with the ordinary kick starter arrangement, without rotating the rear wheel of the bicycle. This is obtained by causing the lay gear of the pedalling device to actuate on the coupling wheel of the small speed instead of on the main gear shaft.

The arrangement according to the invention by which on back pedalling brake rods, leading to the rear wheel of the bicycle are operated, has the additional advantage of presenting a compact construction having a small width, and easily adapted to the frame of the bicycle.

In the accompanying drawing, one construction of the invention is shown by way of example.

Figure 1:
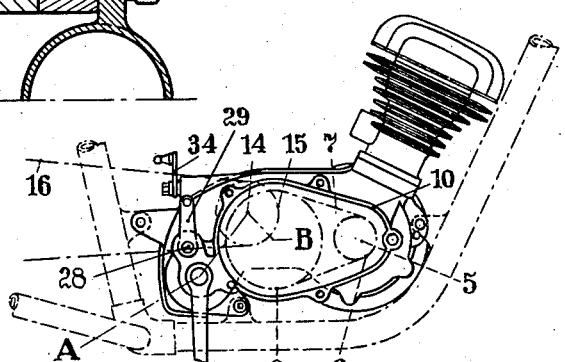

In this drawing:

Fig. 1 is a side view of a bicycle motor, a portion of the bicycle frame being indicated in dash and dotted lines, and Fig. 2 shows on a larger scale a cross section taken on line 2—2 of Fig. 1 through the driving gear.

From the crank shaft 5 of the motor, mounted in the bicycle frame, the drive is transmitted by means of a sprocket wheel 6 and a chain 7 to the larger sprocket wheel 8, loosely mounted upon a shaft 9 and adapted to be coupled to the latter by a disc coupling 9a, which may be selectively engaged and disengaged. The shaft 9 mounted in the gear casing 10 of the motor also carries two toothed rims 11 and 12. A gear wheel 13 loosely mounted upon a shaft 14 meshes with the toothed rim 11. By means of a sprocket wheel 15 and a chain 16 the drive is transmitted from the shaft 14 to the rear wheel. A gear wheel 17 meshes with the somewhat smaller toothed rim 12. This gear wheel 17 also is loosely mounted upon the shaft 14. The gear wheel 17 is combined with a pinion 18 meshing with a gear wheel 20 fixed upon a counter shaft 19. The further transmission from this gear wheel 20 is effected by a pinion 21 connected to the wheel 20 and meshing with a gear wheel 22. The latter is arranged upon the pedal gear shaft 23 and may by means of a roller locking device 25 of well known construction be rotated by the pedal crank in one direction of rotation, i. e., in a forward direction. At the side of this gear wheel 22 a smaller gear wheel 24 is also loosely mounted upon the pedal gear shaft, and on back pedalling, this gear wheel 24 is coupled to the shaft 23 by a locking coupling or a roller locking device 26 similar to the roller locking device 25 but acting in opposite direction. The gear wheel 24 meshes with a pinion 27 affixed to the shaft 28 to which is connected an arm 29 outside the casing. The arm 29 actuates, by way of connecting rods, a rear wheel brake not shown in the drawing.

Mounted upon the shaft 14 is a coupling disc 30 which, due to guides 33, is prevented from rotating but may be slidably displaced for engagement with claws 31 or 32 of the gear wheels 13 and 17, or may run idle in the center position shown in the drawing. The disc is shifted by means of a striker fork not shown in the drawing and a gear lever 34 arranged outside the casing. Different speed ratios may be obtained according to whether the disc 30 is coupled to gear 13 or gear 17. The motor will completely be disconnected from the shaft 9 if the disc coupling 9a is released.

The drive by way of the pedal gear 35 is effected by means of the roller locking device 25, which on forward rotation connects the gear wheel 22 to the pedal gear shaft 23 and causes rotation of same. By way of the gears 21, 20 the gear wheel 22 then drives the pair of gear wheels 18, 17 which, when coupled to the shaft 14 by the disc 30, operates the rear wheel of the bicycle by way of the sprocket wheel 15. A change of speed may, however, be effected by coupling the gear wheel 13 to the shaft 14 by way of the disc 30, whereupon the pair of gear wheels 17, 18 drives the shaft 14 by way of the shaft 9 and the gear wheel 13. This may be effected simultaneously by the motor drive and also by the pedal crank 35 alone, if the coupling 9a is disconnected.

On back pedalling the gear wheel 24 is rotated by the roller locking device 26 in the same direction, while the coupling 25 remains inoperative. By way of the pinion 27 the gear wheel 24 causes swinging of the lever 29 which thereby operates the rear wheel brake.

If the coupling disc 30 occupies the idle running position shown in the drawing, the motor shaft 5 may be rotated by the pedal cranks by way of the intermediate gear wheels 22, 21, 20, 17, the shaft 9, the coupling 9a, the sprocket wheel 8, the chain 7 and the pinion 6, whereby the motor may be started when the bicycle is at rest. This idle running position also allows the use of the free wheel mechanism on a downward sloping road, at which time the motor may be stopped and after engaging the coupling 30, 32 is started again by the kinetic energy of the bicycle.

What we claim is:

In a motor driven bicycle of the type having a motor, a motor crank shaft, and a single motor and gear casing unit, the combination comprising a rotary pedal gear mounted on a pedal shaft near the free end of said unit facing the rear wheel of the bicycle, said pedal shaft being mounted below the horizontal plane passing through the axis of said motor crank shaft, a drive sprocket shaft between said pedal shaft and said motor crank shaft, and above the horizontal plane passing through the axis of said pedal shaft, and above the horizontal plane passing through the axis of said motor crank shaft, a speed change gearing of the motor in said casing having part thereof mounted on said sprocket shaft, a sprocket wheel on said sprocket shaft outside of said casing, a single chain for driving the rear wheel of the bicycle from said sprocket wheel, means for driving said sprocket shaft selectively from said pedal shaft or said motor crank shaft, and means responsive to the rotation of said pedal shaft in a forward direction to initiate operations of the motor.

GUSTAV STEINLEIN.
LUDWIG BRUCKMOSER.